Oct. 5, 1937.   C. BOL ET AL   2,094,694
VAPOR ELECTRIC DISCHARGE DEVICE AND METHOD OF OPERATION
Filed Oct. 26, 1935   5 Sheets-Sheet 1

INVENTORS
Cornelis Bol
Willem Elenbaas
Hendricus J. Lemmens
BY Harry E. Dunham
ATTORNEY

Oct. 5, 1937.  C. BOL ET AL  2,094,694
VAPOR ELECTRIC DISCHARGE DEVICE AND METHOD OF OPERATION
Filed Oct. 26, 1935    5 Sheets-Sheet 3

INVENTORS
Cornelis Bol
Willem Elenbaas
Hendricus J. Lemmens
BY Harry E. Dunham
ATTORNEY Oct. 5, 1937.  C. BOL ET AL  2,094,694
VAPOR ELECTRIC DISCHARGE DEVICE AND METHOD OF OPERATION
Filed Oct. 26, 1935  5 Sheets-Sheet 4

INVENTORS
Cornelis Bol
Willem Elenbaas
Hendricus J. Lemmens
BY Harry E. Dunbar
ATTORNEY Patented Oct. 5, 1937

2,094,694

UNITED STATES PATENT OFFICE 2,094,694

VAPOR ELECTRIC DISCHARGE DEVICE AND METHOD OF OPERATION

Cornelis Bol, and Willem Elenbaas and Hendricus J. Lemmens, Eindhoven, Netherlands, assignors to General Electric Company, a corporation of New York Application October 26, 1935, Serial No. 46,952 In Germany November 5, 1934

12 Claims. (Cl. 176—122)

Our invention relates to vapor electric discharge devices and includes improvements in both the apparatus and the method of operation.

Among the objects of our invention are to produce luminous vapor electric discharge devices of good color operating with a high degree of efficiency and with an extraordinarily high surface brightness or intrinsic brilliancy. Further objects are to provide constructions and methods of operation which enable extremely high vapor pressures to be used.

Although well adapted for general indoor and outdoor illuminating purposes our devices are especially advantageous for projection lighting as, for example, in picture production (both still and moving pictures) beam lighting (as in searchlights) spot lighting and the like.

The modern high intensity mercury vapor lamps which have recently appeared on the market operate at a pressure in the discharge envelope of about one atmosphere, and with a voltage drop along the discharge path of the order of 10 volts per centimeter. The surface brightness or intrinsic brilliancy measured in international candles per square centimeter is of the order of 100 to 150. At lower pressures, the brightness of mercury vapor arcs is lower. For example, the well known low pressure "work light" mercury vapor lamp has a surface brightness of about 2 to 2.5 candles per square centimeter.

The surface brightness of tungsten filaments when operated in the well-known gas-filled tungsten lamps under favorable conditions at the high temperature of 3000° Kelvin, is approximately 1300 to 1400 candles per square centimeter. In special tungsten lamps of about one thousand watts and larger the surface brightness may be as much as 3000 candles per square centimeter.

The intrinsic brilliancy of the ordinary carbon arc lamp is sufficiently high to be adapted for projection purposes, varying with conditions within a range of about 14,000 to 18,000 candles per square centimeter.

In accordance with the principles of our invention vapor electric discharge lamps can be made operating at a very much higher surface brightness where desired. A surface brightness in the range of about 1500 candles per square centimer to 30,000 or more is readily attainable. Indeed a maximum surface brightness of from 150,000 to about 200,000 candles per square centimeter has been obtained in special lamps embodying our invention.

By our new principles of construction and operation we are enabled to produce vapor electric lamps operating with pressures up to hundreds of atmospheres. The new features of construction and operation can however be applied with some advantage to pressures of the order of 10 atmospheres, but we prefer to operate at considerably higher pressures.

Our invention makes possible the provision of gaseous conduction lamps in highly efficient units of unusually small physical size and low wattage or power rating. The ordinary carbon arc lamps and the well-known flaming arc lamps are inherently of relatively large physical size and high power rating, and are relatively expensive. By our invention, in which high pressures are involved we can subdivide such large sources of light into relatively small inexpensive units in the same sense that Edison by his incandescent lamp subdivided the arc lamp, but at the same time we can retain high brilliancy. Our projection lamps moreover do not involve the expense of replacing the carbons, which expense is very appreciable in modern carbon arc projection lamps.

The light from mercury vapor lamps embodying our invention has a substantial component of red rays (present as a continuous spectrum) and hence approaches more nearly white light than does the light from present mercury arc lamps. Moreover, the photographic efficiency with our source is high and in certain cases has been found to be approximately twice as great as that of a carbon arc of the same luminous output.

Our invention will be better understood from the accompanying drawings and the following explanation, and will be more particularly pointed out in the appended claims.

Referring to the drawings.

In order to understand more easily the various curves from which the new operating characteristics of tubes embodying our invention may be determined, we will first describe some of the figures showing the physical structure of the tubes.

Figure 6:
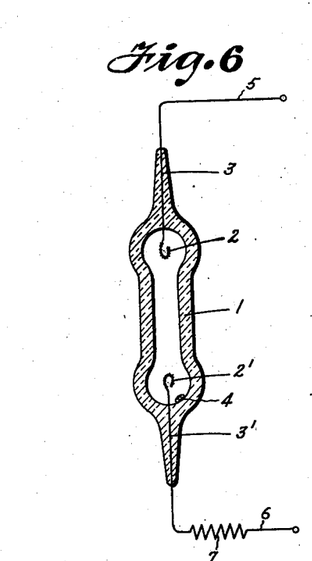
Fig. 6 is an enlarged longitudinal section of a tube embodying our invention showing circuit connections.

Referring to Fig. 6 there is shown in cross section on a somewhat enlarged scale an envelope 1 of transparent material such as vitreous silica (fused quartz) or suitable glass adapted to withstand high temperatures and temperature gradients at high pressures. Adjacent the ends of the envelope are located electrodes 2, 2' between which the discharge through the tube is adapted to be started and maintained. Leading-in conductors 3, 3' which conduct current to the electrodes are hermetically sealed through the ends of the envelope as hereinafter described. A small quantity of mercury indicated at 4 is put in the envelope after it has been effectively evacuated and before the envelope is sealed off. We also put in a charge of gas, preferably rare gas, at low pressure as hereinafter described, to facilitate starting the discharge across the space separating the electrodes. These leading-in conductors are connected to the supply lines 5 and 6 which may be fed by either alternating or direct current at constant voltage. When supplied with alternating current a suitable stabilizing reactance, as diagrammatically indicated at 7, is provided in the circuit, and when direct current is used a suitable resistance may be used.

The amount of mercury required in our lamp is very small as hereinafter pointed out. We locate the mercury so that during operation of the discharge between the electrodes it is directly and effectively heated by the discharge. We also keep the total volume of the discharge space very small, and provide no relatively large condensing areas or chambers. For example, the tube shown in Fig. 6 may have a bore for the discharge between the electrodes of about 2.7 mm. in diameter, and an outside diameter of approximately 6.5 mm. The distance between the electrodes 2, 2' is about 10 mm. or 1 cm. The end portions of the envelope may if desired be slightly enlarged around the electrodes to facilitate the sealing-in operation of the electrodes. The electrodes are located adjacent the ends of the discharge space, and dead spaces in the envelope are substantially eliminated.

The electrodes 2, 2' may be of various kinds as hereinafter pointed out, but in Fig. 6 we show the electrodes as somewhat hook-shaped. They may consist of a tungsten wire on which is helically wound a thin wire of tungsten. This wound structure is provided with a suitable coating having a relatively high electron emissivity at the temperature to which the electrodes are raised by the discharge. For example, an alkaline-earth oxide such as barium oxide may be used.

When the circuit to the lamp is closed, the starting gas permits a discharge to start between the electrodes which very quickly reach a temperature for effective thermionic electron emission, and the heat of the discharge acting on the liquid mercury quickly develops a high pressure in the envelope, the starting period of the lamp thus being quite small.

We have referred to the fact that only a very small quantity of liquid mercury is required in lamps embodying our invention. For example, with a tube having an internal volume of about 0.5 cu. cm., the weight of saturated mercury vapor required to maintain a pressure of 100 atm. in the tube would be only about 100 mg. if the total space where at the temperature of the liquid mercury. Since a large part of the space is along the discharge path and at a temperature far above the temperature of the liquid mercury about half of this amount of mercury would be ample to permit such pressure to be reached, while still leaving some of the mercury unvaporized. A cubic centimeter of liquid mercury weighs about 13 g., and 50 mg. is only about 0.004 cu. cm. or only a few cubic millimeters. The amount of mercury should be sufficient to enable the desired operating pressure to be reached before all of the mercury is vaporized, but as long as there is sufficient mercury for this purpose it is immaterial whether or not there be some excess mercury.

Even should the tube be extended in length to provide a longer discharge path between the electrodes, the volume, nevertheless, remains very small because of the small diameter of the bore of the high pressure tube embodying our invention. For example, if the diameter of the bore were 2 mm., the area of the bore would be $\pi$ sq. mm., and the volume per cm. length of the tube 31.4 cu. mm. or 0.0314 cu. cm. If the diameter of the bore were 5 mm., the volume per cm. length of the bore would still be only 0.2 cu. cm. so that a few cubic millimeters of mercury would be sufficient to maintain the desired pressure in a relatively long tube.

The current required for operating our lamp may be small, ranging, for instance, from about one-tenth of an ampere to about an ampere and a half, so that relatively small leading-in wires are adequate to carry the current to the electrodes.

For instance, the leading-in wires 3, 3' of Fig. 6 may be of tungsten and have a diameter of about 0.6 mm. We have found it possible to maintain a satisfactory hermetic seal at pressures in the envelope of several hundred atmospheres and higher. The difficulty of maintaining a perfectly tight seal at such high pressures between a leading-in conductor and quartz at the high temperatures involved seems, for some reason which we are unable logically to explain, to be reduced by reason of the smallness of the seal. To those skilled in the art it is a striking thing that the seal can be made to remain tight with the great temperature variations involved and with pressures running to hundreds of atmospheres or thousands of pounds per square inch. It should be borne in mind, moreover, that the making of seals for an envelope subjected to enormously high internal pressures is more difficult than the making of seals for an evacuated envelope. In the first place, even with a perfect vacuum, there is only a low pressure (atmospheric pressure) to seal against, and in the next place the pressure in the case of a vacuum device is exerted in a direction to press the material of the envelope around the seal and keep the seal tight, while in sealing against an internal pressure, the pressure tends to pry the joint apart and acts progressively in a manner analogous to the progressive removing of a postage stamp from a letter by starting at one edge with a knife blade and progressively spreading the two surfaces apart.

We have found that successful seals may be made by using between the tungsten leading-in wires and the quartz an intermediate glass layer of the glass composition disclosed in co-pending application Serial No. 43,230, filed October 2, 1935, by Cornelis Bol, Hendricus J. Lemmens and Gottfried B. Jonas, assigned to the assignee of the present application. This glass composition is as follows:—

| | Percent |
|---|---|
| Silica ($SiO_2$) | 88.3 |
| Boric acid ($B_2O_3$) | 8.4 |
| Aluminium oxide ($Al_2O_3$) | 2.9 |
| Calcium oxide (CaO) | 0.4 |

In some cases a small amount of alkali may be added advantageously, for example, sodium oxide ($Na_2O$), which may be added as silicate of soda, in amounts up to about 1.5%. A glass of this composition is weldable by fusion both to tungsten and to quartz to produce a hermetic seal which is mechanically strong and gas-tight even at the elevated temperatures existing at the seal and with the high pressures present in the envelope during the operation of the lamp. The seal between the tungsten leading-in wire and the quartz cylinder can be made by fusing a layer or plug of the glass on the wire, and also fusing a hemispherical cap of the glass on the end of the quartz cylinder. An opening is then made in this cap through which the tungsten wire with its layer of glass is inserted, whereupon the cap and layer are fused together.

Lamps of our invention may be either air cooled by a natural circulation of air or cooled by a forced circulation of a fluid such as air or by using a cooling liquid such as water as hereinafter pointed out. The lamp we have described in connection with Fig. 6 is adapted for air cooling and should preferably be operated in a substantially vertical position so that there will be liquid mercury adjacent one of the electrodes.

We prefer to make the thickness of the wall of the tube of the order of, but preferably not greater than the diameter of the bore. In some cases a wall thickness somewhat less than the diameter of the bore is desirable. In connection with the description of Fig. 6 we have mentioned an inner diameter of 2.7 mm. and an outer diameter of approximately 6.5 mm. which gives a wall thickness of about 1.9 mm.

The stresses which cause failure of the tube are of two kinds. First there are stresses due to differences in temperature between the inside and outside walls of the tube. These stresses increase as the ratio between the outside and inside diameters is increased. Second there are stresses due to the fact that the internal pressure is greater than the external pressure. These latter stresses decrease as the ratio between the outside and inside diameters is increased. For each tube according to the particular conditions under which it is to be operated there is a particular ratio of the outside to the inside diameter for which the resultant of these stresses is a minimum. This ratio can be readily found bearing in mind that the temperature of the inner wall of the tube for a given condition of cooling is determined by the watts put into the tube per centimeter length of the discharge path, and that the temperature of the outside wall is of course determined by the manner in which the tube is cooled, while the voltage drop per centimeter length of the discharge path is a measure of the internal pressure. For example, with water cooling when the temperature difference between the inner wall and the outer wall is 800° C. and the outside diameter is three times the inside diameter (in this case the thickness of the wall is equal to the diameter of the bore) a pressure of 140 atmospheres may be easily withstood.

With tubes of small diameter particular care should be taken to avoid scratches or small cracks in the external surface, as these are apt to enlarge and cause failure of the tube.

A further appreciation of the small physical size of our discharge tubes may be gained from the fact that the envelope with its electrodes weighs only approximately 3 grams for a 100 watt lamp. For convenience in terminology, we refer to these lamps as "capillary" lamps, even though the inside diameters of the tubes are larger than the inside diameter of tubes commonly considered as capillary tubes.

While we have mentioned that such a lamp as shown in Fig. 6 is preferably operated in a substantially vertical position it may be operated even in a horizontal position, and it is apparent that while not in operation the lamp may be turned to any position and handled and shipped freely because of its small weight and the fact that it is not fragile in construction.

The starting of the lamp is as simple as the starting of an incandescent lamp in that the circuit need merely be closed. It is not necessary to apply any external heat to the lamp to start it into operation. Neither is it necessary to start the lamp by tilting it forward and back to produce and break a thread of mercury between the electrodes. Indeed, the diameter of the bore is ordinarily so small that, even were there a sufficient quantity of mercury to complete the circuit from one electrode to the other, the mercury would not flow readily through the small capillary tube.

When the circuit is closed the lamp with natural air cooling reaches its normal operating temperature relatively quickly, as compared, for example, with about 10 minutes for the modern high intensity or one atmosphere mercury vapor lamp. With natural air cooling if the lamp circuit is opened and quickly reclosed the lamp requires some time to cool before it will restart. When water cooling is used our lamp can be made to reach its normal operating temperature almost at once when the circuit is closed. On opening the circuit, the vapor pressure in the lamp due to the rapid cooling is so quickly lowered that when voltage is again impressed across the electrodes the lamp will almost instantly restart.

The gas which we use to facilitate starting the tube is preferably a rare gas such as argon or neon. A charge of argon at a pressure from about 10 mm. to a few centimeters or more of mercury pressure at room temperature is satisfactory, although we prefer in some cases to use neon with a mixture of about 0.2% of argon.

When the discharge starts between the electrodes 2, 2' of Fig. 6, heat is effectively delivered to the liquid mercury 4 and rapid vaporization of the mercury takes place. The vapor pressure in the envelope corresponds approximately to the temperature to which the surface of the liquid mercury is raised. All portions of the inner wall of the discharge space adjacent the electrodes soon come to substantially as high a temperature as the surface of the liquid mercury. The walls of the capillary being close to the arc attain a still higher temperature, because the core of the arc stream is at a temperature of the order of 6500° K. or more. If it be assumed that some portion of the inner wall of the envelope of Fig. 6 is for the moment below the temperature of the surface of the mercury, then mercury vapor will be condensed on such portion of the wall. As the vapor condenses it delivers up to the wall surface an amount of heat equal to that which was required to convert the mercury from liquid to vapor. The action therefore is to keep all portions of the inner wall substantially as hot as the surface of the mercury. Upon any attempt to cool one portion, the condensation of the mercury at that portion supplies so much heat that it is impossible to cool that portion appreciably below the temperature of the surface of the mercury, therefore the temperature of the surface of the mercury will fall. The effect of increasing the size of the envelope is to make it more difficult to maintain the desired temperature of the liquid mercury. In our small tubes we can easily attain almost any desired temperature of the surface of the liquid mercury, and by relatively small adjustments in the cooling or heat dissipating rate of the coolest portion we can control the temperature of the surface of the mercury and therefore the pressure in the tube.

The amount of heat that must be delivered to the liquid mercury is equal to the heat that is conducted away from the mercury through the liquid mercury plus the heat necessary to maintain all parts of the inner surface of the envelope at substantially the temperature of the surface of the mercury (which fixes the pressure in the envelope) except those parts of the surface of the envelope which are maintained at the requisite high temperature by the heat of the arc itself. In other words, the heat that must be supplied to the mercury is equal to the heat that is used to heat all parts of the envelope to the desired temperature which are not already heated to that temperature directly from the discharge, plus that conducted away through the mercury and otherwise.

From the foregoing description it will be apparent that in tubes operated in accordance with our invention the liquid mercury is located so as to receive heat in a direct and effective way from the discharge, and that the discharge space is so small and condensing rate over all portions of its inner surface so low that the surface of the liquid mercury may be maintained at a high temperature with a correspondingly high pressure in the envelope.

In order to attain a pressure of even one atmosphere in the modern high intensity mercury vapor lamp, which has an enormous volume compared to our lamp, it is customary to jacket or heat insulate the envelope in which the discharge takes place. According to our invention much greater pressures can be attained even though the envelope is not heat insulated or even if the envelope is vigorously cooled as it must be in certain cases in order to keep the inner wall of the quartz capillary at a temperature which it can stand with a usefully long life.

The present high intensity or one atmosphere lamps have an efficiency of about 40 lumens per watt when made in a 400 watt size. This is reduced to about 35 lumens per watt when the lamp is made in a 250 watt size. While modern sodium lamps have an efficiency of 50 to 60 lumens per watt when made in a 200 watt size, the color of the light limits the application of sodium lamps to special fields. Our capillary lamps with moderate specific loading (hereinafter defined) have an efficiency of about the same order as that of the large size present high intensity lamp and the color of the light is more nearly white due to a substantial component of red. With greater specific loading we can obtain still higher efficiency and still better color. The efficiency of the present gas-filled tungsten lamps is only about 20 lumens per watt. Moreover on the same basis of measurement the surface brightness or intrinsic brilliancy (light per unit area) of the present high intensity one atmosphere lamp is about 150 candles per square centimeter and the gas-filled tungsten lamp about 1500, while with our capillary lamps these values can be far exceeded. As will hereinafter appear, water cooled lamps may have a brightness of over 30,000 and it is possible to attain several times even that value.

Although our lamps may not be heat insulated and may lose heat rapidly by conduction through the walls of the envelope, we nevertheless can attain high efficiency and extreme brightness because of the effective manner we put heat into the mercury, and maintain all portions of the inner wall at a temperature substantially as high as that of the surface of the mercury.

Referring again to Fig. 6, let it be assumed (contrary to the fact) that the end portion of the inner wall adjacent the upper electrode 2 would tend to remain at a lower temperature than the corresponding end portion adjacent the lower electrode 2'. This is not the fact in an alternating current lamp proportioned as in Fig. 6 because the heat of the arc, if the electrodes are similarly placed with respect to the ends of the envelope, is delivered equally to both end portions,—neglecting for the moment the effect of convection currents in the mercury vapor. But continuing our assumption that the upper end tends to run cooler, the condensation of the mercury vapor on the upper end portion delivers to this portion as much heat as was required to vaporize the mercury at the lower end of the tube, so that heat is effectively delivered by the mercury vapor from the lower end to the upper end. The mercury acts as a kind of heat pump in thus transferring heat from the lower end to the upper end. Moreover, the evaporation of the liquid mercury at the lower end tends to cool the liquid mercury, and heat must be abstracted from the arc to keep up the temperature of the mercury. The heat carried to the upper end by convection currents in the mercury vapor makes the upper portion of the envelope tend to run actually hotter than the lower end. To offset this tendency the electrodes may be moved downwardly slightly in the envelope so that the lower electrode is slightly nearer to, and the upper electrode slightly farther from, the adjacent end of the envelope while the distance between the electrodes remains the same. As we have heretofore pointed out the action is, however, always to tend to temperature equalization between the coolest portion and the surface of the mercury. The heat pumping action is the same with respect to any portion of the wall that tends to run cooler than the surface of the mercury.

By keeping the total volume very small and by avoiding relatively large condensing spaces we are enabled to attain high temperatures and pressures and a ready adjustment of the desired pressure. Since the total volume is fixed, as well as small, (there being, for example, no expansion chambers into which the liquid mercury can move), the pressure increases in our tubes with any increase in the power put into the arc from the supply circuit. Moreover, there being no relatively large areas or chambers the walls of which have a strong cooling effect, the amount of mercury which needs to be vaporized and condensed to keep the cooler portions of the inner walls at substantially the temperature of the surface of the mercury is relatively small. It will be apparent, for example, that if there were such a chamber it would impose a heavy duty upon the mercury heat pump to keep the walls of the chamber hot.

In the tube of our invention heat is delivered to the mercury in sufficient degree to maintain the surface of the mercury at a temperature which will give the desired high pressure in spite of the cooling effect caused by evaporation of the mercury and in spite of the cooling of the outside of the envelope. Moreover since all portions of the inner wall of the envelope receive heat from the discharge a relatively small duty is imposed on the mercury pumping cycle, which, however acts effectively to keep all portions of the inner wall (not heated to as high or higher temperature by the discharge) at substantially the same temperature as the surface of the liquid mercury.

As heretofore pointed out a very small quantity of mercury is sufficient for the purpose, but care does not have to be exercised to prevent any excess mercury, as is the case with the modern one atmosphere lamps where it is customary carefully to put in just the amount of mercury that will, when entirely vaporized, produce the desired operating pressure.

We have heretofore mentioned the fact that by relatively small adjustments in the cooling or heat dissipating rate of the coolest portion of the inner wall we can control the temperature of the surface of the liquid mercury and thereby control the vapor pressure in the tube.

Figure 6A:
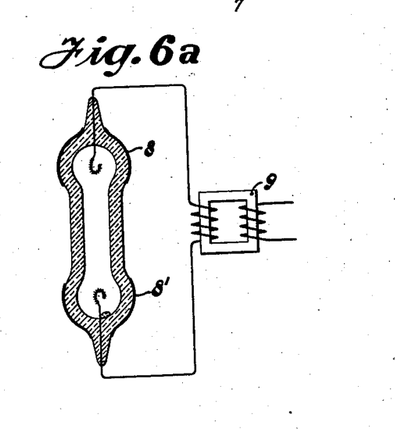
Fig. 6a shows a modification of Fig. 6.

The inner surface of the capillary tube, being close to the arc stream is at a higher temperature than the end portions of the tube. In other words the end portions are the cooler portions of the inner wall of the envelope. The end portions may be made to run hotter by locally applied heat shields. For example, one or both ends may be shielded by a shiny or mirror-like coating of platinum. Such coatings are shown in Fig. 6a at 8 and 8'. They reduce the escape of heat from the end portions and are very effective in bringing the end portions nearer to the temperature of the capillary portions. Their use permits a control of the temperature at the cooler end portions for any given power input from the supply circuit. These end shields afford one practical and effective means whereby the relation of power input to vapor pressure may be adjusted. That is to say, the same vapor pressure within limits may be attained in the tube with different values of power input or, conversely, different vapor pressures may be attained with the same power input.

When discharges take place in gas or vapor at very low pressures the discharge is diffuse and practically fills the envelope in which it takes place. At a higher pressure the discharge becomes more concentrated and arc-like. In our high pressure tubes the arc is constricted to a narrow filament along the centre of the capillary portion of the tube. The arc energy is concentrated in this small space which consequently becomes exceedingly bright. An increase of pressure further constricts the arc, reducing it to a filament of still smaller cross section. It requires a higher voltage between the electrodes to force the same current to flow at the higher pressure. The result, in this respect, is analogous to replacing a tungsten filament extending between the electrodes with a tungsten filament of smaller cross section and consequently higher resistance to the flow of current.

By changing the extent of the end coatings, we can adjust the pressure and operating voltage of our lamps. If, for example, a lamp with electrodes spaced 1 cm. apart should require 120 volts (V/cm=120) to pass a current of 0.2 ampere through the arc, we may, by increasing the extent of the coating, increase the vapor pressure until it requires for example, 150 volts (V/cm=150) to pass the same current of 0.2 ampere through the arc.

When a lamp of the dimensions we have described in connection with Fig. 6 is connected to a suitable alternating current source, it can be operated in free air with a voltage across the electrodes of about 240 volts, and with a current of about 0.4 ampere. The power consumption will be about 75 watts or a little higher. The power is somewhat less than the product of the current and voltage because the voltage wave is not a true sine wave and the lamp has an apparent power factor of less than unity. The vapor pressure under these conditions will be about 60 atmospheres or nearly 900 pounds per square inch.

We may with a slight decrease in efficiency make a small power unit also by using a relatively long separation between the electrodes, and operating at a lower vapor pressure. For example, in a lamp having an inside diameter of 4 mm., an outside diameter of 7 mm. and an electrode separation of 18 mm., with a current of 0.4 ampere, and a voltage between the electrodes of 220 volts, the load was about 70 watts, and the vapor pressure about 20 atmospheres. This lamp had a useful life of over a thousand hours with natural air ventilation.

A lamp similar in structure having an inside diameter of about 2.3 mm., an outside diameter of 4 mm., an electrode separation of 20 mm., an energy input of about 80 watts at 0.39 ampere and a voltage of 250 volts, has at the operating temperature a pressure of about 20 atmospheres.

The gaseous pressure is about 50 atmospheres in a device having an inside diameter of 4 mm., an outside diameter of 7 mm., an electrode separation of 10 mm., with a current of 0.34 ampere and an operating voltage of 200 volts, the load being about 55 watts.

While our lamps are highly efficient in units of small power one of their additional advantages is that they can be made of larger power merely by extending the length of the capillary tube, and correspondingly raising the operating voltage. For example, in a lamp intended to be used for illumination of large areas, such as plazas, airports or the like, the gap between the electrodes 2, 2' was 200 mm., or 20 cm. The inside diameter was about 2.3 mm., and the outside diameter about 6 mm. The energy input in this case was approximately 1000 watts at 0.5 ampere, the voltage between the electrodes being about 2500 volts and the gaseous pressure being about 25 atmospheres.

We shall now refer to some of the curves shown in the drawings to explain features of operation of our lamps. To understand these curves it will be helpful further to explain certain terms or expressions.

We shall frequently use the expression "specific voltage drop". The specific voltage drop for any given lamp can be determined by reducing the voltage measured between the electrodes by the sum of the cathode and anode drops and dividing the remainder by the length of the discharge path. The sum of the cathode and anode drops is fixed amount for any given electrode material. This sum with oxide-coated electrodes is about 15 volts. Therefore if the voltage measured between the electrodes is, for example, 215 volts and the distance between the electrodes is 10 mm., or 1 cm., the specific voltage drop will be 200 volts per cm., or V/cm=200, for oxide-coated electrodes.

We shall also use the expression "specific loading". By this we mean the watts put into the tube per unit length of the discharge path. It is determined by measuring the watts input to the tube and dividing this by the length of the discharge path. If the power input is 40 watts, for example, and the distance between the electrodes is 1 cm., we say that the specific loading is 40 watts per centimeter, or W/cm.=40.

We have heretofore used the expression "lumens per watt". It means the number of units of visible light per watt input into the tube. As we have heretofore said, the ordinary gas-filled tungsten lamp has an efficiency of about 20 lumens per watt, or L/W=20.

Figure 1:
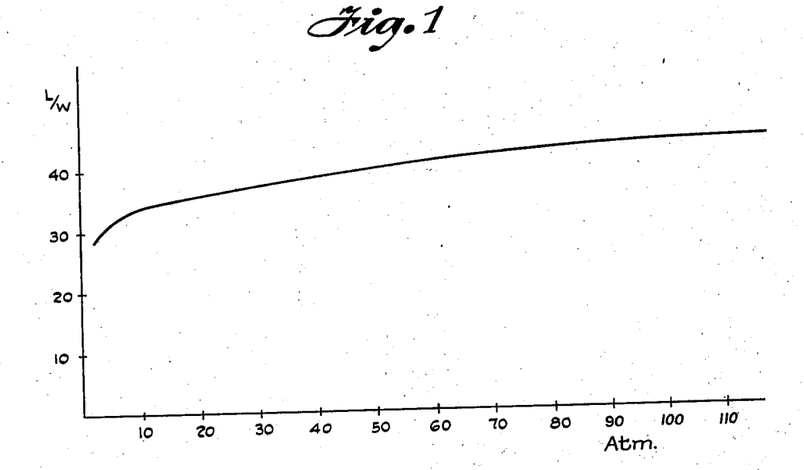
Fig. 1 is a curve showing the general relation between lighting efficiency and pressure in the tube with constant power consumption per unit of length of the discharge path.

Referring now to Fig. 1, we have there shown a curve indicating the general relation in our lamps of the lumens per watt to the pressure in the envelope measured in atmospheres, with a given constant specific loading. In other words the power or watts per centimeter (W/cm.) was kept constant. The various pressures were obtained by varying the current through the lamp and adjusting the vapor pressure. The curve is given for a lamp of given diameter.

From Fig. 1 we see that the lighting efficiency of a given lamp of the kind we have described falls off quite rapidly at pressures lower than about 10 atmospheres, and increases relatively slowly at higher pressures. The curve obtained with any particular lamp is a function of the specific loading and varies with the internal diameter or bore of the lamp. It is difficult to say whether or not the curve has a maximum after which a further increase in pressure will reduce the lumens per watt, but we have found that at 125 atmospheres the curve is approximately horizontal. By decreasing the specific loading, the curve is raised so that higher efficiencies result.

Figure 2:
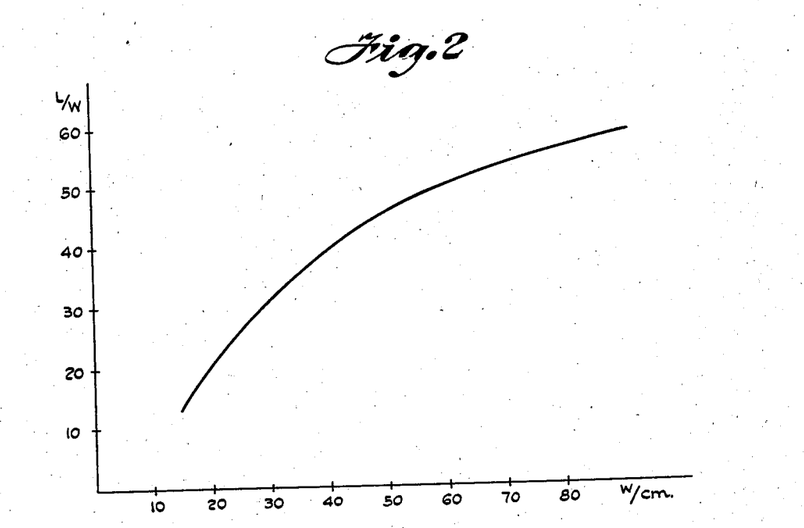
Fig. 2 is a curve showing the general relation of efficiency to the power consumption per unit of length of the discharge path.

Referring now to Fig. 2, we have there shown an average curve indicating the general relationship between light efficiency (L/W) and specific loading or watts per centimeter input of our capillary lamps. The values for the various lamps may be a little above or below the curve depending upon the mercury vapor pressure and the inside diameter. With water cooled lamps (hereinafter described) the specific loading may be carried to very high values, but with air cooling the specific loading cannot be so great, although by controlling the dissipation of heat from the coolest portion we can operate at a value of W/cm. which gives efficiencies of about 40 lumens per watt even in a lamp with free air cooling. We can indeed obtain very good efficiencies even where the enclosing bulb is evacuated. With the lower values of specific loading the efficiency is lower.

Although one would expect that the specific loading could be made greater the larger the inside diameter of these capillary tubes, we have found that the maximum permissible specific loading is dependent only slightly on the inside diameter. The tubes may fail due to an excessive vapor pressure or to an excessive temperature difference between the inner and outer walls. By an adjustment of the temperature of the end portions the pressure may be kept from exceeding a safe value, but with increases in the specific loading the temperature of the inner wall may reach a point where the tube fails for that reason. On the other hand if the specific loading is so chosen that the temperature difference is kept below the permissible limit, the tube may nevertheless be made to fail by adjusting the pressure to too high a value. In general the higher the specific loading of a given tube, the shorter will be the life of the tube for given cooling conditions.

Even air cooled lamps, however, may be operated with a usefully long commercial life at a sufficiently high specific loading to produce a pressure in the envelope where relatively high operating efficiencies may be obtained,—more than twice that of the gas-filled tungsten lamp.

Where underwriters' requirements permit, we prefer to operate with a specific loading that will produce at least 20, and preferably 40 or more, atmospheres in air cooled lamps. These pressures correspond respectively to specific voltages of about 120 to 250 in a 2 mm. tube, and 110 to 200 in a 4.5 mm. tube, depending on the value of the current used.

Since the specific voltage drop in these tubes is a function of the mercury vapor pressure, it is possible to determine the vapor pressure in a simple manner from the specific voltage drop, which it will be remembered is the voltage between the electrodes (less the sum of the cathode and anode drops) divided by the distance between the electrodes.

Figure 3:
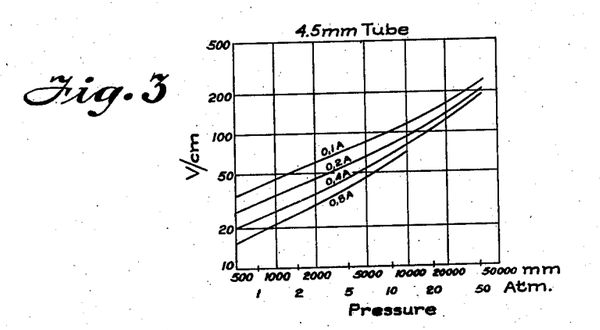
Figs. 3 and 4 are diagrams showing the relation between the pressure and the voltage drop per unit of length of the discharge path of particular tubes operated at different current values.

Referring to Fig. 3, we have there shown a series of curves on a logarithmic scale showing the relation between the specific voltage drop (V/cm) and the pressure in millimeters of mercury pressure (760 mm.=1 atm.), and in atmospheres, in a tube of 4.5 mm. inside diameter. The curves are drawn for current values of 0.1, 0.2, 0.4, and 0.8 ampere.

Figure 4:
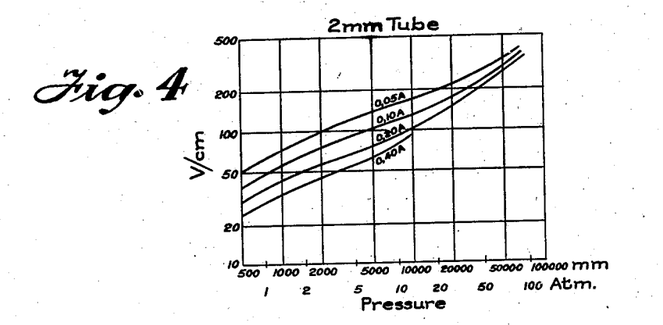

In Fig. 4 we have shown a similar set of curves for a tube of 2 mm. inside diameter, and current values of 0.05, 0.1, 0.2 and 0.4 ampere.

From Figs. 3 and 4 it will be observed, for example, that with a current of 0.2 ampere through the tube a specific voltage drop of about 115 volts corresponds to a pressure of 20 atmospheres in the 4.5 mm. tube, and a specific voltage drop of about 210 volts corresponds to a pressure of 50 atmospheres; while in the 2 mm. tube a specific voltage drop of about 130 volts corresponds to a pressure of 20 atmospheres, and a specific voltage drop of about 225 volts corresponds to a pressure of 50 atmospheres.

Extremely high specific loadings going well above 500 W/cm. are possible in the water cooled lamp. With air cooled lamps the value will not generally exceed about 50 W/cm. although higher loadings are possible.

While we prefer to operate well above 20 atmospheres it will be apparent that the new features of our construction are applicable to lamps of lower pressures and that fairly good efficiencies can be obtained at 10 atmospheres and slightly below.

In our capillary tubes the entire energy of the arc stream is confined by the high pressure into a narrow pencil in the axis of the capillary tube. This high concentration of energy produces in the arc a temperature of the order of 6000 to 9000 degrees Kelvin, a temperature at which ionization and excitation are produced by thermal effects, and as a result the maximum surface brightness or the maximum light per unit area of surface is astonishing.

Figure 5:
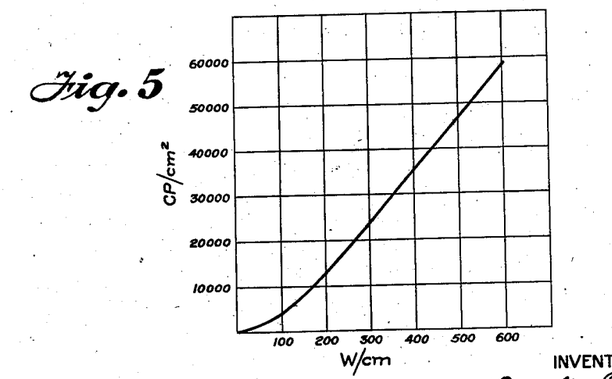
Fig. 5 is a curve showing for a given tube the relation between brightness and power consumption per unit of length of the discharge path.

In Fig. 5 we have shown a curve showing how the maximum brightness in candles per square centimeter ($CP/cm.^2$) increases with increases in the specific loading of a tube. The tube from which this curve was taken had an inner diameter of 2.5 mm. and an outer diameter of 7 mm., and an electrode spacing of 10 mm. During the taking of this curve the increase in the watts input from 100 W/cm. to 600 W/cm. was accompanied by an increase in the vapor pressure from 40 atmospheres to 200 atmospheres.

Figure 7:
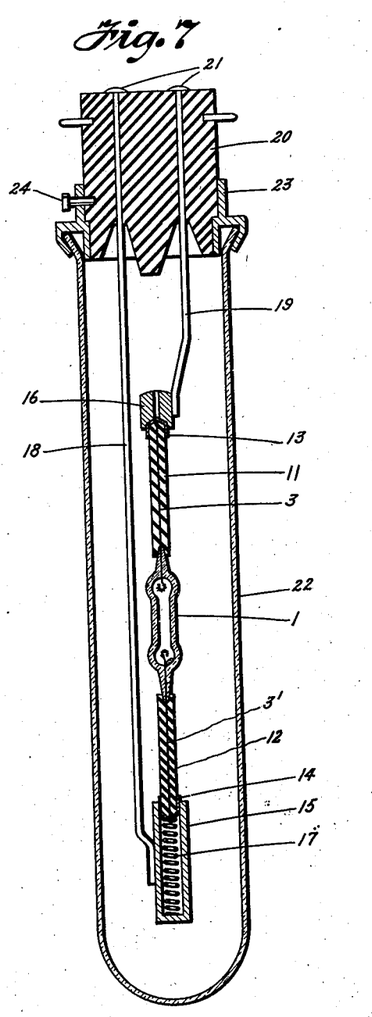
Figs. 7 to 10 inclusive show various lamp assemblies.

The lamp unit illustrated in Fig. 7 of the drawings comprises a vapor electric discharge tube similar to that shown in Fig. 6. To reduce the loss of heat, the external parts of the current leads 3, 3' of the tube are surrounded by small, electrically insulating tubes 11, 12 of high melting point material, such as magnesium oxide or aluminium oxide. Metal contact caps 13, 14 are attached to the ends of said tubes 11, 12 and are electrically connected to the wires 3, 3'. One of the caps 14 is inserted into and makes electrical contact with the metal socket 15 and the other of said caps 13 is inserted into and makes electrical contact with the metal socket 16. The socket 15 has a coiled spring 17 therein which presses against the lower cap 14 to hold the tube in position in the sockets 15 and 16. A downwardly exerted force is all that is necessary to remove the discharge tube from the sockets. The sockets are supported by metal rods 18 and 19 attached to a base 20 made of electrically insulating material, such as porcelain. The base 20 has two electrical contacts 21 thereon which are connected to the rods 18 and 19. A hard glass bulb 22 closed at one end is shown surrounding the discharge tube, the open end of the bulb being flared and fastened to the base 20 by the copper ring 23 and screws 24.

The bulb 22 can be made of glass which transmits no ultra-violet rays. If in addition to visible rays, one desires to make use of the ultra-violet rays, the bulb 22 may be made of an ultra-violet transmitting glass. When desired the bulb 22 may be provided with openings at or adjacent the ends thereof to permit cooling air to circulate therethrough as will be shown, for example, in connection with Fig. 9.

Figure 8:
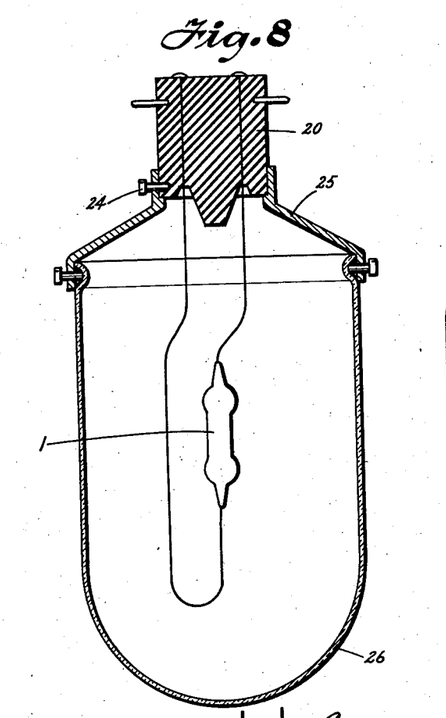

The lamp unit illustrated in Fig. 8 of the drawings is similar to that shown in Fig. 7 except that in this embodiment the discharge tube is permanently fastened to the base 20 by the current leads thereof, and a reflector 25 supporting the bulb 26 is fastened to the base 20. When desired, openings (not shown) are provided in the bulb 26 and the cap 25 for the circulation of air.

Figure 9:
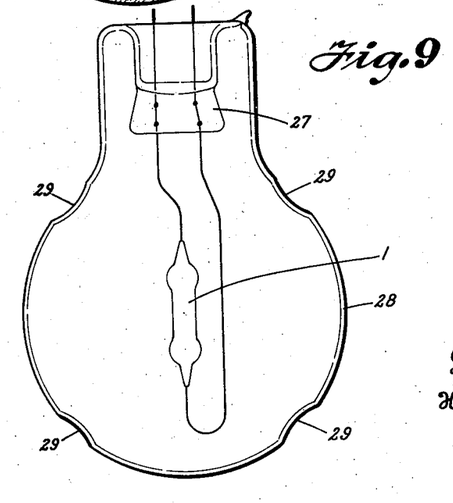

In the lamp unit illustrated in Fig. 9 of the drawings the current leads for the lamp are sealed into the pinch 27 of the glass bulb 28, which is provided with the openings 29 for the circulation of air for cooling. When desired, the openings 29 may be omitted, and the bulb 28 sealed after evacuation, or it may be filled with an inert gas, such as nitrogen. This latter structure precludes any possibility of the diffusion of hydrogen through the quartz wall into the interior of the container.

The surrounding glass bulb shown in Figs. 7, 8 and 9 affords protection in the event of a breakage of the discharge tube. Even though a tube be operating at a pressure of a hundred or more atmospheres, a breakage of the tube does not produce a destructive explosion as one might suppose, because the total volume of vapor under pressure is so small, and as soon as the pressure is released the further development of pressure ceases. If desired, however, the surrounding bulb may be made with relatively thick strong walls or additional protection may be secured by a wire netting or the like.

Figure 10:
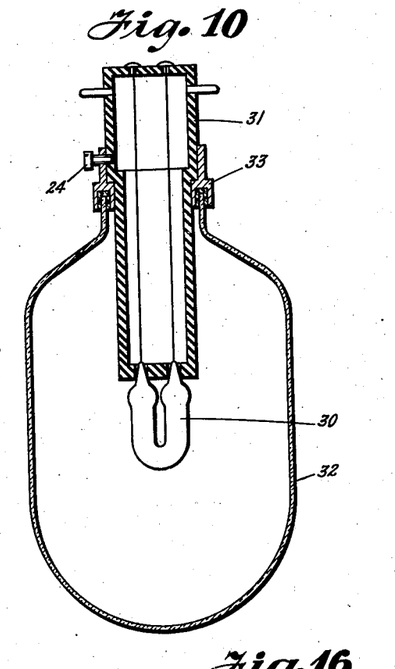

The discharge tube shown in Fig. 10 has a U-shaped envelope 30 but in other respects may be like the discharge tube shown in Fig. 6. The lamp unit illustrated comprises a tubular bayonet base 31 closed at one end and having two openings at the opposite end into which the ends of the envelope 30 are inserted. The current leads for the lamp are enclosed by the base 31. A glass bulb 32 surrounds the discharge tube and is fastened to the base 31 by a metal ring 33 and screws 24, the open neck of the bulb being cemented to the ring 33.

The glass enclosing bulbs shown in Figs. 7 to 10 may be provided with a frosted or other light diffusing surface where the brightness of the discharge tube is objectionable from the standpoint of glare.

It will be apparent that the small size of our discharge tubes adapts them to combining or mixing with other sources of light such as incandescent lamps, while to combine the present one atmosphere mercury lamp with an incandescent lamp makes a unit of objectionably large size. Moreover the small wattages required by our capillary lamps in the small sizes enables a combined unit to be made of such a low total wattage that ordinary wiring systems can safely carry the load.

The color of the light of our lamps is so good however that they may be used very satisfactorily without combining them with other light sources. With the high mercury vapor pressures which exist in the lamps of our invention the light emitted has a fairly good continuous spectrum which contains much red so that there are strong red rays in addition to the blue and green rays contained in the usual mercury vapor spectrum.

While our invention in its broader aspects is not limited to the use of electrodes giving a high electron emission at moderate temperatures, the use of solid hot electrodes contributes to quiet and steady operation of the arc. The smaller the inside diameter for a given pressure the more steady the arc will be. Raising the pressure tends to make the arc move about more, so that it is preferable to choose the smaller inside diameters for the higher pressure tubes. While it is possible with solid hot electrodes to operate with tubes up to about 7 mm. inside diameter, it is preferable to choose an inside diameter smaller than 5 or 4 mm. whereby higher pressures can be used than with a larger diameter, with a resulting improvement in the color of the light and the steadiness of the discharge.

The stroboscopic effect of our high pressure lamps is only about one-half that of the present one atmosphere high intensity mercury vapor lamp, and they are accordingly still better from the standpoint of flicker. There is practically no flicker when they are operated on alternating current circuits of 60 cycles, and they can be operated on circuits of as low as 25 cycles. The reason for this is probably that with these higher pressure higher temperature discharges, in which there is an enormous centration of energy in the arc stream, the heat energy of the atoms, ions and electrons stored in the arc stream cannot be as quickly transmitted to the walls of the tube because of the numerous collisions that must occur before a particle can move an appreciable distance away from the arc stream. Consequently the arc stream does not lose its luminosity at the zero points of the current wave to such a large degree as is the case with low pressure discharges. An incidental advantage is that the reverse current wave can be started more easily owing to the residual ionization in the arc path.

We have heretofore pointed out that lamps of higher wattage may be produced merely by lengthening the capillary tubes and correspondingly increasing the voltage. If a more concentrated source of high power is desired, the capillary tube may be coiled so as to concentrate the light source into a relatively small space. If the diameter of the helix is kept reasonably large compared to the inner diameter of the capillary tube, no difficulty should be experienced from any tendency of the arc to damage the tube by pressing against it.

Any desired operating voltage may be readily provided by a small transformer located at each lamp. In order to enable the lamps readily to start, and to operate steadily, we at present prefer to provide an open circuit voltage which is about twice the operating voltage of the lamp, although a somewhat lower open circuit voltage may be used. For example, if the lamp is designed to operate with a voltage between the electrodes of 250 volts, a 400 volt open circuit voltage will be sufficient. Where a transformer is used, the reactance may be provided as leakage reactance in the transformer. Such a transformer is diagrammatically shown at 9 in Fig. 6a.

It will be observed from Figs. 3 and 4 that after the vapor pressure exceeds a value between 10 and 20 atmospheres the current curves approach each other more closely. This means that at the higher pressures the operation of the lamp becomes more stable in the sense that an increase in the current does not lower the voltage drop per centimeter across the lamp as much as the same increase in current would lower the voltage drop per centimeter at lower pressures. This enables the higher pressure lamps to be operated with an open circuit voltage which does not exceed the operating voltage by as great a proportion as in the lower pressure lamps. In other words with relatively high pressures our lamps have a somewhat greater inherent stability. If therefore there should be a sudden rise in the voltage supplying the transformer the current through the lamp will not increase so much as it would in a lower pressure lamp, and a smaller percentage of stabilizing reactance may be used. Correspondingly, with direct current operation a somewhat smaller value of stabilizing resistance may be used.

While no auxiliary means are necessary to facilitate starting, it is apparent that the lamps may be made to start with less differences between the open circuit voltage and the operating voltage by providing an external conductor, which may be spiraled around the tube if desired, extending from one of the electrodes to a point about opposite the other electrode, as is well-known in the art.

Figure 11:
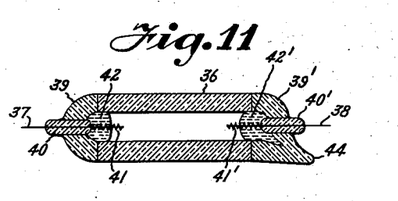
Figs. 11 and 12 are longitudinal sections of modifications particularly adapted for water cooling.
Figure 12:
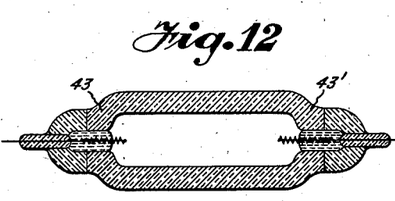

Figs. 11 and 12 illustrate modified tube structures adapted particularly for water cooled lamps, where pressures going up to relatively high values are desired. In the structures illustrated a somewhat larger quantity of mercury is necessary than needs to be used in air cooled lamps, such as we have described in connection with Fig. 6 and other figures. To obtain the desired higher pressures we bring the surface of the mercury closer to the end of the arc stream. The tubes illustrated are intended to be used in a substantially horizontal position and a small quantity of mercury is located during operation in each end of the tube. One of the important features of the tubes shown in Figs. 11 and 12 is that the electrodes are partially submerged in the liquid mercury for a purpose hereinafter described. These tube constructions are most useful in envelopes of small internal diameters, in general less than about 3.5 mm.

In the tube shown in Fig. 11 the envelope 36 is made of fused quartz, and has an internal diameter of 2.2 mm. and an outside diameter of 5.5 mm. Leading-in conductors 37, 38 are sealed into the ends of this envelope. The seals may be made by fusing caps 39, 39' of glass having a composition as hereinbefore described to the tubular body of the envelope, and then sealing tungsten leading-in wires provided with sealed-on layers or plugs 40, 40' of said glass into openings in the caps, the plugs and caps then being joined by fusion to make a hermetic, mechanically strong seal.

Each of the tungsten leading-in conductors projects into the interior of the envelope 36 and, as described in connection with Fig. 6, a thin tungsten wire may be wrapped round the end portions 41, 41' and coated with a material promoting electron emission, to constitute the electrode. The electrodes are surrounded as shown by a quantity 42, 42' of mercury or amalgam, the ends of the electrodes projecting a short distance out of the liquid.

The mercury is held in the ends of the small envelope by capillary attraction. This action may be increased as shown in Fig. 12 by making the ends 43, 43' of the envelope of smaller diameter than the main part of the envelope, to retain the liquid mercury in the desired positions. A fixed gas, such as neon, which may contain 0.2% argon at several millimeters to several centimeters pressure of mercury at room temperature is put into the tube to facilitate starting of the discharge between the electrodes.

One of the advantages of the construction illustrated is that the liquid mercury covers the seal between the cap and the quartz and between the leading-in conductor and the sealing glass. The arrangement shown in Fig. 12 is particularly advantageous in this respect, because by reason of the length of the cylinder of liquid mercury the seal is more remote from the surface of the mercury than in the arrangement of Fig. 11 and therefore at somewhat lower temperature by reason of the external cooling.

It will be observed that in Figs. 11 and 12 the surface of the liquid mercury is brought relatively close to the end of the electrode and therefore is brought into a position, where it receives heat very effectively from the arc stream. The surface of the mercury may therefore be brought to a correspondingly high vapor pressure in the envelope. The arrangement has two very important advantages according to one of which the life of the oxide-coated electrodes may be increased and according to the other of which the distance which an electrode projects beyond the mercury may be readily adjusted during the manufacture of the tube. This latter adjustment gives a ready control of the temperature of the surface of the mercury and thereby a control of the vapor pressure. During operation of the discharge tubes the electrodes being surrounded by the liquid mercury and projecting only slightly therefrom, are subjected to a cooling effect because of the conduction of heat away through the mercury. In addition the lively vaporization of the mercury produces currents of mercury vapor which brush past the hot electrodes and cool them. The electrodes can in this way be prevented from reaching too high a temperature even though the tubes be very heavily loaded.

The distance which the electrodes should project beyond the mercury during operation is dependent upon the conditions under which the tube is operated. If the distance that the electrodes protrude is too small, too high a vapor pressure may be developed during operation, and if the distance is too great it will be more difficult to achieve the desired vapor pressure. In general the distance which the hot electrodes protrude out of the mass of the vaporizable metal will be smaller than about 5 mm.

The distance which the electrodes protrude may be readily adjusted during the manufacture of the tube by providing a small auxiliary tube or appendix filled with mercury which appendix may be located adjacent one end of the tube and open into the interior of the tube below the surface of the liquid mercury. In Fig. 11 this auxiliary tube is shown as constituted by the seal-off tip 44 which was used during the evacuation of the envelope. If it is desired to increase the amount of mercury around the electrodes in the tube this can be done by heating and squeezing together to a greater extent the outer end of the appendix hereby forcing the mercury from the appendix into the tube proper. By connecting the tube into a test circuit and observing the electrical values of the discharge it can be determined whether or not a sufficient amount of mercury surrounds the electrodes. By repeated displacements of small amounts of the metal out of the small auxiliary tube an exact adjustment of the distance that the hot electrodes protrude out of the metal can be obtained.

The constructions shown in Figs. 11 and 12 are of great advantage in water cooled tubes, wherein a high voltage drop per centimeter of length of the discharge path is desired. Voltage drops of more than 150 volts per centimeter or higher make these constructions desirable. With these tubes voltage drops greater than 300 or 400 volts per centimeter can be easily obtained. A specific voltage drop of 400 volts per centimeter corresponds to a vapor pressure of the order of 100 atmospheres. Tubes have been constructed with voltage drops of more than 1000 volts per centimeter.

An example of a tube made in accordance with Fig. 11 had an inside diameter of 2.2 mm. and an outside diameter of 5.5 mm. with a spacing between the electrodes of 10 mm., while the electrodes projected from the liquid mercury a distance of about 1.3 mm. When supplied with alternating current through a suitable reactance with an operating current of 1.75 amperes, the voltage between the electrodes was 558 volts corresponding to a pressure of about 150 atmospheres, and the power input 755 watts. The lamp operated with an efficiency of about 60 lumens per watt, and the maximum surface brightness (CP/cm.$^2$) was about 32,000.

When it is desired to have a lamp with a good output of ultraviolet radiation in the Dorno region (2750–3100 Å.) it is not desirable to have a mercury vapor pressure in the envelope greater than about 20 atmospheres because of absorption effects. An example of such a tube built in accordance with Fig. 12 had an inside diameter of 4.5 mm. and an outside diameter of 7.5 mm., the ends being reduced, so that the inside diameter was only about 1.8 mm.

These tubes when operated with high specific loading require vigorous cooling, by water or the like by suitable cooling means, an example of which will be hereinafter briefly described in connection with Fig. 13. The tubes can be made in units of large power when desired. For example, we have built a tube having an inside diameter of 2 mm. and an outside diameter of 7 mm. with a spacing between the electrodes of 32 cm. The tube operated with a specific voltage drop of 400 volts per centimeter and a current of 1.8 amperes, and a power of about 17,000 watts. The vapor pressure was about 100 atmospheres. The open circuit voltage of the transformer was about 19,000 and the operating voltage about 12,800 volts. In this tube tungsten electrodes were used there being no oxide coating. The light given off by such a tube presents so nearly a continuous spectrum and contains such a proportion of red that it is nearly white in color.

If it is desired in particular tubes to obtain lines in the spectrum corresponding to particular metals, other vaporizable metals as for instance cadmium or zinc can be present in the tube together with the mercury in the form of amalgam.

Figure 13:
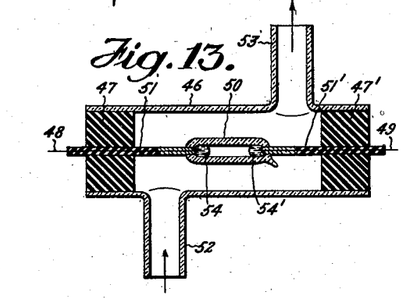
Fig. 13 shows a further modification and illustrates apparatus for water cooling the tube.

Referring to Fig. 13 we have diagrammatically shown means for water cooling tubes of the type we have just described, and have in this figure illustrated a further modification of the tube which may be used. This tube, like the tubes shown in Figs. 11 and 12, is preferably operated in a horizontal position. The tube shown in Fig. 13 differs from that heretofore described in that mercury electrodes are used without a solid electrode projecting through the mercury. This form of tube with mercury electrodes alone is not adapted for direct current operation, because of the tendency of the mercury to collect at one of the electrodes during operation. For this reason it is also much preferable to operate tubes of the type shown in Figs. 11 and 12 with alternating current.

The tube 50 shown in Fig. 13 is surrounded by a glass or quartz cylinder 46 the ends of which are closed by stoppers 47, 47' of waterproof material such as rubber. The current leads 48, 49 are surrounded by tubes 51, 51' of waterproof electrically insulating material, such as glass, and pass through the stoppers 47, 47'. Inlet and outlet tubes 52, 53 are provided for the supply and escape of water or other cooling liquid during the operation of the lamp.

Figure 13A:
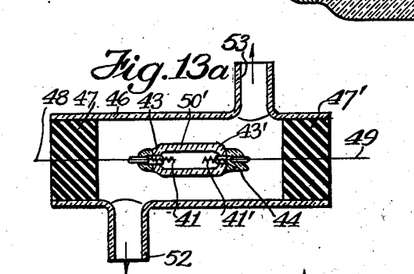
Fig. 13a similarly shows a water-cooling apparatus containing a lamp having structural features shown in Figs. 11 and 12.

The tube 50' shown in Fig. 13a is contained in a cylinder 46 having parts bearing the same reference numerals as in Fig. 13, (the waterproof tubes 51, 51' of Fig. 13 being omitted merely to simplify the drawing). The tube 50' has reduced end portions 43, 43' (as shown in Fig. 12), the end 43' being provided with a small appendix filled with mercury constituted by the seal-off tip 44 (as shown in Fig. 11). The electrodes 41, 41' are surrounded by and project from the mercury to a slight extent (as shown in Figs. 11 and 12).

While the pressure inside and outside of the envelope of the water cooled lamp might be more or less equalized by putting the cooling system under pressure, we at present prefer not to do this because the cooling system may be made in a more simple manner when the pressure of the cooling water is low. Moreover, any failure of a part of the high pressure cooling system might be somewhat destructive, whereas the failure of the envelope of the lamp is, as heretofore pointed out, quite harmless.

The ends of the envelope 50 may be constricted as above described in connection with Fig. 12. The mercury electrodes are indicated at 54, 54'. As is the case with the other figures the envelope contains a starting gas. Somewhat higher starting voltages are required than is the case when oxide coated electrodes are used. The quantity of mercury in the envelope may be adjusted as described in connection with Fig. 11.

An example of a tube built in accordance with Fig. 13 comprises an envelope having an internal diameter of 2 mm., an outside diameter of 6 mm. and a spacing between the electrodes of 10 mm. With a current of 1.5 amperes, the power was 310 watts, the specific voltage drop 300 volts and the pressure in the tube about 65 atm. The constricted discharge between the electrodes had a diameter of about 1 mm. The efficiency was over 50 lumens per watt, while the maximum surface brightness of the discharge was about 18,000 CP/cm.$^2$ It will be understood that the leading-in conductors may be sealed into the envelope by means of a suitable glass as heretofore described.

Figure 14:
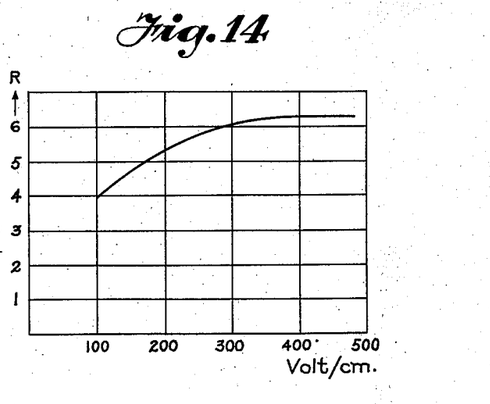
Fig. 14 is a curve showing the approximate relation of the efficiency in candles per watt to the voltage drop per unit length of discharge path for a given tube with constant current supplied thereto.

Fig. 14 shows the approximate relation of the efficiency R in International candles per watt to the voltage drop per centimeter length of the discharge path of a given tube with a constant value of the current through the tube. The curve was obtained by varying the cooling. It will be remembered from the foregoing description that the voltage drop per centimeter is dependent upon the pressure in the tube, and that the pressure in the tube is in turn dependent upon the temperature of the coolest portion of the inner wall.

The curve shown in Fig. 14 is approximately flat at the higher specific voltages and it is not likely that the curve has any pronounced maximum.

These tubes may readily be mounted in suitable projecting apparatus, which will be provided with reflectors or lenses and the like according to the use which is to be made of the apparatus.

Referring again to tubes, which are not artificially cooled, there may be cases in which it is desired to reduce the maximum brightness to avoid glare. We have hereinbefore mentioned the fact that the enclosing bulb may, if desired, be provided with an etched or diffusing surface. This may be done either on the outside or on the inside surface, but preferably on the inside to avoid collecting dust. The etched surface may also be provided on the light unit or envelope itself, but owing to the tendency of small cracks or crevices to weaken the envelope as heretofore pointed out, ordinary etching is usually undesirable in the case of tubes of small diameter. Where tubes are operated with relatively high specific loading, the discharge itself tends to produce an effect on the inner surface which diffuses the light. It is therefore possible after tubes have been constructed to operate them for a time at such a high load as to give a suitable diffusing effect, if desired, after which the loading may be reduced to the normal value for which the tube is designed. The so called etching operation will be performed preferably after a tube is finished so that the inside of the tube may be observed during its manufacture.

Figure 15:
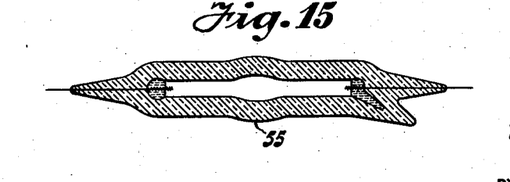
Fig. 15 shows a modified tube construction.

While these high pressure capillary tubes of our invention tend in the course of time to become etched or diffusing, the tubes can be given a diffusing effect, where desired, as soon as they are manufactured.

Where a diffusing effect is not desired, but on the contrary a great surface brightness or high intrinsic brilliancy is desired, the life of the tube, or the time before its maximum brightness becomes too much reduced, may be extended by slightly enlarging the center portion of the discharge path as indicated at 55 in Fig. 15. At this widened portion of the tube the etching effect of the discharge is considerably reduced. The enlargement should be slight, because it has a tendency to reduce the temperature of the tube making the temperature of this enlarged portion more nearly approach the temperature of the end portions and act as a condensing chamber to too great an extent. This idea is not herein claimed, but forms the subject matter of an invention of Cornelis Bol and Hendricus J. Lemmens, two of the joint inventors of the present application, and the invention forms the subject matter of U. S. application Serial No. 73,746 filed on April 10, 1936.

The etching of the inside wall of water cooled tubes may be retarded by such vigorous cooling that the inner wall will remain at a temperature below that at which a bright red glow takes place.

As hereinbefore pointed out, our high pressure capillary lamps produce a substantial component of red rays improving the color of the light. The color of the light or air cooled lamps may be improved by providing a reflector, having a reflecting surface containing a suitable rhodamine preparation, for instance such a reflector may be provided on the inner surface of the cap 25 of Fig. 8. A particularly effective rhodamine dye is one giving red fluorescence, such as the material "Rhodamine B 500", which material is dissolved in a condensation product of an aliphatic multibasic acid and a multivalent alcohol. As the condensation product, it is possible to use for instance the product which can be obtained from the symmetrical dimethylglycol and citric acid. This condensation product can be dissolved in acetone and the rhodamine dye can be dispersed in this solution. The mixture obtained in this manner may be provided in a thin layer on the inside of the cap 25 of Fig. 8.

It was found that such a rhodamine surface had a relative long life when used with these high pressure capillary lamps where the pressure was considerably higher than 10 atmospheres, for instance higher than 20, 30, 40 or 50 atmospheres, because a rhodamine dye fades rather quickly when subjected to rays having a wave length of approximately 2537 Angstrom, and rays of this lenth are suppressed to a large extent in our high pressure lamps. Moreover the absorption of rays of a wave length of 3000–5000 Angstrom, in which range a large part of the light is emitted from discharges in mercury vapor at very high pressures, is very slight, and this fact contributes to the color-retention properties of the fluorescent layer so as to give it a large useful life.

Figure 16:
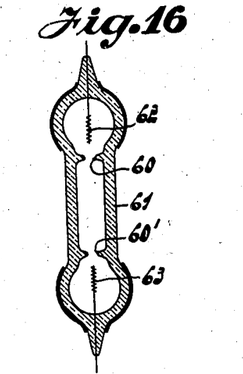
Fig. 16 shows a further modification.

In Fig. 16 there is shown in a more or less diagrammatic fashion a longitudinal cross-section of a form of lamp of the type shown in Fig. 6, provided with an improvement for reducing the blackening of the inner walls of the lamp from particles thrown off from the electrodes. To accomplish this result restrictions 60, 60' are provided at each end of the discharge portion 61 of the capillary tube. The oxide coated electrodes 62, 63 extend within the end portions to a point near the restriction. In this way most of the blackening occurs in the end portions and is kept out of the light giving portion of the tube. These restrictions may be formed in various ways according to one of which the end portions are first made and the electrodes sealed therein, and then the end portions, which are of quartz, are joined to the cylindrical capillary portion. By making each end portion with an inturned flange at the open end these inturned portions form the desired annular restrictions. This construction not only provides the desired restricted portions, but also facilitates the assembly of the electrodes in the end portions during manufacture. The construction shown in Fig. 16 is not claimed herein, but is claimed in application Serial No. 81,860 filed May 26, 1936, by Henricus Gooskens which corresponds to German application No. N38,716 filed October 14, 1935.

Figure 17:
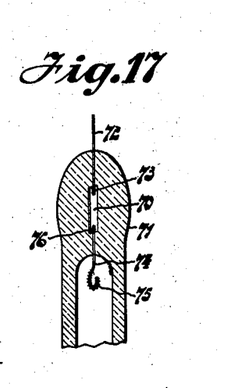
Figs. 17 and 18 show modified sealing arrangements which may be used in the tube of our invention.

While we prefer to use a single transition glass as heretofore described to seal the leading-in conductors into the envelope it will be apparent that our invention in its broader aspects is not limited to this particular kind of sealing. In some cases graded seals may be used. Lamps embodying and operating according to the present invention have been made entirely of quartz without any special sealing glass. In Fig. 17 we have indicated a construction in which a very thin ribbon of molybdenum 70 is sealed directly into the quartz end portion 71 of the envelope. The tungsten leading-in conductor 72 is welded to one end of the molybdenum ribbon 70 at 73, and the tungsten conductor 74 which supports the electrode 75 is welded to the other end of the molybdenum ribbon at 76.

The cross-section shown in Fig. 17 is taken at an angle in order to show the molybdenum ribbon 70 in perspective. The ribbon is a very thin piece or foil preferably about 0.15 mils, or 0.004 mm. in thickness. It is important to keep the foil clean and free from grease during making and handling. To secure the conductors to the thin strip of foil the welding apparatus disclosed in the application of Harold W. Lord, Serial No. 659,053 filed March 1, 1933, and assigned to the assignee of the present application, may be used. This welding apparatus is also disclosed in French Patent No. 769,492 delivered June 9, 1934.

Figure 18:
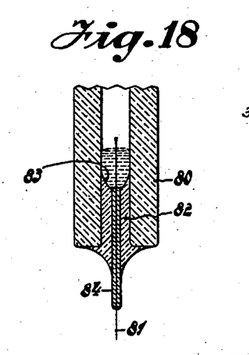

In Fig. 18 we disclose another form of seal, making use of the special glass which we have heretofore described in which the transition glass is enclosed by the tube material over a length which is larger than the wall thickness of the tube as described in the copending application of Cornelis Bol and Hendricus J. Lemmens, two of the joint inventors in the present application, Serial No. 81,866 filed May 26, 1936, corresponding to German application No. N38,561, filed Aug. 31, 1935.

We have found this manner of leading the current supply wires through the tube to be of particular utility for tubes of very small diameter. Fig. 18 illustrates a discharge tube which we have made which consists of a quartz tube 80 whose internal diameter is 1 mm. and whose wall thickness is also 1 mm. In each end there is sealed a leading-in conductor 81 consisting of tungsten through the use of the special glass we have heretofore described. In making a seal, a plug 82 of the liquid transition glass is drawn into the tube 80 by suction and sealed to the quartz. In the glass plug a hole is made by means of a gas current, for instance, air supplied to the interior of the quartz tube. This forms a concave wall 83 on the inner end of the glass plug so that the plug is joined to the inner wall of the quartz tube 80 at a thin edge. The leading-in conductor 81 is covered with a layer 84 of the transition glass and then the layer and the plug are sealed together. This construction is of special utility for very small tubes operating with high pressures.

A water cooled lamp with an electrode construction at each end like that shown in Fig. 18 and having a 1 mm. bore and a wall thickness of 1 mm., as described, and a charge of starting gas at a pressure of a few centimeters, was operated with tungsten electrodes unprovided with any oxide coating. The space between the electrodes was 10 mm. and with a current of 1.5 amperes through the lamp, the voltage between the electrodes was 800 volts and the pressure in the envelope about 200 atmospheres. The maximum brightness was about 160,000 CP/cm.$^2$.

With a tube having an internal diameter of 0.75 mm. we were able to obtain a still greater surface brightness, for instance, about 200,000 CP/cm.$^2$ While in special cases we are able to operate without oxide coated electrodes, such electrodes are of particular advantage for the reasons we have heretofore set forth. Electron emission elements consisting entirely or for the most part of strontium oxide have not heretofore been used in practice, as the emission is considerably smaller than in the case for example of barium oxide. It has been discovered, however, that this objection to the use of strontium oxide is of no importance in mercury vapor discharge tubes with particularly high mercury vapor pressures, because the electrodes are heated by the greatly constricted discharge to such a high temperature that an electron emission which is ample is obtained. Moreover, the use of such electrodes is of distinct advantage because the strontium oxide evaporates to a considerably smaller extent than barium oxide. By the use of the strontium oxide a longer useful life of the electrodes is obtained, and there is a less rapid deposition of electrode material on the walls of the tube and consequently a smaller decrease in the transparency to light.

It is apparent that electrodes of thoriated tungsten may be used as well as electrodes of the so-called Pirani cathode construction which comprise a pellet of a mixture of tungsten and suitable oxides such as barium oxide and strontium oxide.

While we have shown and described certain specific constructions and examples of various devices embodying and operating in accordance with our invention, it will be understood that modifications may be made without departing from the spirit and scope of our invention.

What we claim and desire to secure by Letters Patent of the United States is:

1. A capillary mercury vapor electric discharge tube of the class described having an inside diameter from the order of 1 to the order of 7 millimeters and made of high melting point light transmitting material such as quartz or hard glass, a solid electrode adjacent each end of the tube between which electrodes the discharge is started and maintained, the volume of the space within the tube being so small that all portions of the inner wall of the tube receive heat radiated from the discharge, a quantity of mercury in the tube located to receive heat directly and effectively from the discharge whereby a small quantity of mercury can transfer sufficient heat to maintain all portions of the inner wall, not heated to a higher temperature by the discharge, at substantially the same temperature and whereby a relatively small change in the temperature of the coolest portion of the inner wall will effectively change the temperature of the liquid surface of the mercury, the heat dissipating capacity of the cooler portions of the tube being such that with a specific loading between 25 and 100 watts per centimeter a vapor pressure greater than 10 atmospheres may be maintained in an air cooled tube, there being in the tube a starting gas such as neon whereby the discharge may be started by merely applying voltage across the electrodes.

2. A mercury vapor electric discharge lamp comprising an envelope having an inside bore of from the order of 1 to the order of 5 millimeters in diameter and a wall thickness of the order of but at least substantially as thin as the diameter of the bore, electrodes one at each end of said envelope, leading-in conductors for said electrodes hermetically sealed through the end portions of said envelope, said envelope along the length of said bore being composed of a light transmitting material such as quartz adapted to withstand high temperatures and temperature gradients at high pressure, the total volume of the discharge space being fixed and so small and the condensing rate over all portions of the inner wall of the envelope being so low that with currents of from about 0.2 to 2 amperes the heat developed by the discharge will raise the pressure sufficiently to produce a specific voltage drop of from about 75 to several hundred volts per centimeter, with an efficiency of at least 25 lumens per watt.

3. A vapor electric discharge lamp comprising an envelope, solid electrodes of relatively high electron emissivity at the temperatures to which they are raised by the discharge located one adjacent each end of said envelope, leading-in conductors for the electrodes hermetically sealed through the end portions of said envelope, a charge of gas in said envelope to facilitate starting the discharge across the space separating said electrodes, a quantity of mercury in said envelope of the order of a few cubic millimeters adjacent during operation to one of the electrodes so that heat will be effectively delivered to the liquid mercury, said envelope having a bore for the discharge between the electrodes of the order of 1 to 5 millimeters in diameter and a wall thickness of the order of 1 to 3 millimeters and composed along the discharge space of a light transmitting material such as quartz adapted to withstand high temperatures and temperature gradients at high pressures the total volume of the discharge space being so small and the condensing rate over all portions of the inner wall of the envelope being so low that the vaporization of less than all of the mercury will develop with air cooling a pressure in the envelope sufficient to produce a specific voltage drop of the order of 85 to 250 volts per centimeter, with a specific loading of the order of 25 to 100 watts per centimeter.

4. A capillary mercury vapor electric discharge lamp of the class described comprising a hermetically sealed tubular envelope containing a starting gas, and oxide electrodes one located adjacent each end of the envelope between which electrodes the discharge is adapted to be started and maintained, leading-in conductors for the electrodes sealed through the end portions of the envelope, the internal diameter of said envelope being within a range of about 2 to 5 millimeters and the interior of the envelope being substantially cylindrical so as to avoid wall portions having relatively high condensing rates, a quantity of mercury in the envelope located to receive heat directly and effectively from the discharge and means comprising a reflecting metal coating for restricting the heat dissipation from an end portion of the tube to control the specific voltage at which the tube operates for a given loading.

5. A capillary mercury vapor electric discharge tube of the class described comprising a sealed tubular envelope containing a starting gas, oxide electrodes mounted one adjacent each end of the tubular envelope between which electrodes the discharge is adapted to be started and maintained, a quantity of vaporizable metal therein located to receive heat directly and effectively from the discharge the bore of said envelope being of the order of 2 to 5 mm. in diameter the inner walls of said tubular envelope along the discharge path being composed of a light transmitting material such as quartz adapted to withstand high temperatures without softening, the wall thickness being sufficiently great to withstand a pressure of at least 100 atmospheres in the envelope and sufficiently thin to withstand stresses due to the difference in temperature between the inner and outer walls which obtains when the tube is operating with a specific loading of from 30 to 100 watts per centimeter and a specific voltage drop of from 75 to 300 volts per centimeter.

6. A capillary high pressure mercury vapor electric discharge tube of the class described comprising an envelope having reduced end portions in which liquid mercury is located and maintained during the operation of the tube, solid electrodes one located adjacent each end of the envelope and partially submerged in the liquid mercury whereby the discharge between said electrodes raises the temperature of the surface of the liquid mercury to increase the pressure in the envelope and whereby the liquid mercury cools the electrodes during operation of the discharge.

7. A capillary high pressure mercury vapor electric discharge tube of the class described comprising a tubular envelope, electrodes in said envelope located one adjacent each end thereof between which electrodes the discharge is started and maintained, a quantity of mercury near one end portion of said envelope located adjacent one of the electrodes to receive heat directly and effectively from the discharge, a small appendix tube filled with liquid mercury and opening into the envelope below the normal surface level of the mercury in the envelope whereby the distance of the surface of the liquid mercury from the tip of the adjacent electrode may be adjusted by forcing mercury from the appendix into the envelope by reducing the volume of the appendix.

8. A capillary high pressure mercury vapor electric discharge lamp of the class described comprising a substantially cylindrical hermetically sealed envelope, an electrode located adjacent each end of the envelope, liquid mercury in the end portions of said envelope surrounding said electrodes the end portions of the envelope being of such small internal diameter that the liquid mercury has a tendency to remain in the end portions by a capillary attraction, said envelope having a relatively small appendix filled with liquid mercury the appendix opening into the end portion being behind the normal surface line of the liquid mercury during operation of the discharge whereby the extent that the electrodes project from the surface of the mercury may be adjusted by forcing liquid mercury from the appendix into the envelope by reducing the volume of the appendix.

9. A capillary mercury vapor electric discharge lamp of the class described having a capillary discharge tube having an inside diameter of the order of 1 to 3 millimeters and having a wall composed of high melting point light transmitting material such as quartz and a solid electrode located in each end portion of the tube and a quantity of mercury in each end portion of the tube each of said electrodes being surrounded by and projecting from the mercury to a slight extent, leading-in conductors sealed into the end portions of the tube the seals being covered by the mercury, means for circulating a liquid cooling medium about the tube adapted to maintain the end portions thereof at such temperatures that with a specific loading of from about 150 to over 1000 watts per centimeter the voltage drop per centimeter remains within a range of from about 100 to about 1000 volts per centimeter.

10. The method of operating capillary mercury vapor electric discharge tubes of the class described in which the total volume of the discharge space is fixed and in which liquid mercury is located to receive heat effectively from the discharge, which comprises putting into the tube such an amount of power as will give a specific loading corresponding to an efficiency of the order of 25 to 70 lumens per watt while maintaining the inner walls of the capillary below a softening or devitrifying temperature and controlling the heat dissipation from the coolest portion of the inner wall to maintain in the tube a specific voltage which corresponds to a vapor pressure of at least 10 atmospheres.

11. The process of adjusting the operating voltage of a capillary mercury vapor electric discharge tube of the class described in which the total volume of the discharge space is fixed and in which liquid mercury is located to receive heat effectively from the discharge, which comprises maintaining the specific loading at a substantially constant value and adjusting the rate of heat dissipation from the coolest portion of the inner wall to produce in the tube a specific voltage drop which added to the sum of the cathode and anode drops substantially equals the desired operating voltage.

12. An electric lamp comprising an elongated, tubular envelope having an inside diameter from the order of 1 to the order of 7 millimeters made of a light-transmitting material, such as quartz or hard glass, solid electrodes of relatively high electron emissivity at temperatures to which they are raised by a discharge therebetween located one adjacent each end of said envelope, the volume of the space within said envelope being so small that all portions of the inner wall of said envelope receive heat radiated from such discharge therein, a quantity of mercury in said envelope located so as to be effectively vaporized by the heat of the discharge, and a starting gas, such as neon, in said envelope, whereby the discharge may be started between said electrodes by merely applying voltage across the electrodes, the heat-dissipating capacity of the cooler portions of the envelope being such that with a specific loading between 25 to 100 watts per centimeter a vapor pressure as high as of the order of 10 atmospheres may be maintained in said envelope.

CORNELIS BOL.
WILLEM ELENBAAS.
HENDRICUS J. LEMMENS.

CERTIFICATE OF CORRECTION.

Patent No. 2,094,694.   October 5, 1937.

CORNELIS BOL, ET AL.

It is hereby certified that error appears in the printed specification of the above numbered patent requiring correction as follows: Page 2, second column, line 16, for the word "where" read were; page 6, first column, line 63, for "decreasing" read increasing; page 8, second column, line 50, for "electrode" read electrodes; page 10, second column, line 54, for "or" read of; page 12, first column, line 49, for "pressure" read pressures; and that the said Letters Patent should be read with these corrections therein that the same may conform to the record of the case in the Patent Office.

Signed and sealed this 16th day of November, A. D. 1937.

(Seal)

Henry Van Arsdale,
Acting Commissioner of Patents.